US011531206B2

(12) United States Patent
Akiyama

(10) Patent No.: US 11,531,206 B2
(45) Date of Patent: Dec. 20, 2022

(54) LIGHT SOURCE APPARATUS AND PROJECTOR

(71) Applicant: SEIKO EPSON CORPORATION, Tokyo (JP)

(72) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 408 days.

(21) Appl. No.: 16/745,501

(22) Filed: Jan. 17, 2020

(65) Prior Publication Data

US 2020/0233226 A1    Jul. 23, 2020

(30) Foreign Application Priority Data

Jan. 21, 2019    (JP) .............................. JP2019-007797

(51) Int. Cl.
| | |
|---|---|
| *G02B 27/30* | (2006.01) |
| *G02B 27/09* | (2006.01) |
| *H04N 9/31* | (2006.01) |
| *G03B 21/20* | (2006.01) |
| *G02B 27/14* | (2006.01) |

(52) U.S. Cl.
CPC ......... *G02B 27/30* (2013.01); *G02B 27/0905* (2013.01); *G02B 27/0966* (2013.01); *G02B 27/141* (2013.01); *G03B 21/20* (2013.01); *H04N 9/3152* (2013.01); *H04N 9/3161* (2013.01)

(58) Field of Classification Search
CPC .... H04N 9/315; H04N 9/3141; H04N 9/3152; H04N 9/3161; H04N 9/3197; G03B 21/006; G03B 21/008; G03B 21/20; G03B 21/28; G03B 21/142; G03B 21/145; G03B 21/208; G03B 21/2053; G02B 27/30; G02B 27/34; G02B 27/40; G02B 27/141; G02B 27/0905; G02B 27/0966
See application file for complete search history.

(56) References Cited

U.S. PATENT DOCUMENTS

| | | | |
|---|---|---|---|
| 7,460,287 B2 * | 12/2008 | Tan ....................... | G02B 26/101 353/100 |
| 2004/0004748 A1 * | 1/2004 | Kawabata ............ | G02B 26/124 359/216.1 |
| 2006/0256181 A1 * | 11/2006 | Ehrmann ........... | G02B 27/0031 347/137 |
| 2012/0147334 A1 * | 6/2012 | Mizushima .......... | H04N 9/3164 353/38 |

(Continued)

FOREIGN PATENT DOCUMENTS

| | | |
|---|---|---|
| JP | 2005-134736 A | 5/2005 |
| JP | 2017-027903 A | 2/2017 |

(Continued)

*Primary Examiner* — Sultan Chowdhury
(74) *Attorney, Agent, or Firm* — Dority & Manning, P.A.

(57) ABSTRACT

The present disclosure relates to a light source apparatus including a laser light source that outputs a laser beam and a collimator system that parallelizes the laser beam. The collimator system includes three lens groups. A first group includes a first anamorphic lens having negative power in a first direction. A second group includes a second anamorphic lens having positive power in a second direction perpendicular to the first direction. A third group includes a third anamorphic lens having positive power in the first direction.

12 Claims, 5 Drawing Sheets

(56) References Cited

U.S. PATENT DOCUMENTS

| | | | |
|---|---|---|---|
| 2012/0236264 A1* | 9/2012 | Akiyama | G03B 21/2013 |
| | | | 353/30 |
| 2015/0036106 A1* | 2/2015 | Nagahara | H04N 9/3114 |
| | | | 353/31 |
| 2016/0373704 A1 | 12/2016 | Akiyama | |
| 2017/0068098 A1* | 3/2017 | Chern | G01B 11/2513 |
| 2017/0227744 A1* | 8/2017 | Sakata | G03B 21/142 |
| 2017/0343891 A1* | 11/2017 | Sakata | G03B 21/2013 |

FOREIGN PATENT DOCUMENTS

| | | |
|---|---|---|
| JP | 2017-138471 A | 8/2017 |
| JP | 2017-211417 A | 11/2017 |

\* cited by examiner

LIGHT SOURCE APPARATUS AND PROJECTOR

The present application is based on, and claims priority from JP Application Serial Number 2019-007797, filed Jan. 21, 2019, the disclosure of which is hereby incorporated by reference herein in its entirety.

BACKGROUND

1. Technical Field

The present disclosure relates to a light source apparatus and a projector.

2. Related Art

As a light source apparatus used in a projector, there is a technology of related art for causing a laser beam outputted from a laser light source to be efficiently incident on a lens array by using two cylindrical lenses having cylindrical surfaces perpendicular to each other to convert the light flux shape of the laser beam into a substantially circular shape (see JP-A-2017-211417, for example).

In the light source apparatus described above, a large difference between the maximum and minimum of the angle of divergence of the laser beam requires a large distance between the two cylindrical lenses to convert the light flux shape of the laser beam into a substantially circular shape. The large distance causes a problem of an increase in the size of the light source apparatus.

SUMMARY

According to a first aspect of the present disclosure, there is provided a light source apparatus including a laser light source that outputs a laser beam and a collimator system that parallelizes the laser beam. The collimator system is formed of three lens groups. The first group includes a first anamorphic lens having negative power in a first direction. The second group includes a second anamorphic lens having positive power in a second direction perpendicular to the first direction. The third group includes a third anamorphic lens having positive power in the first direction.

In the first aspect described above, the first anamorphic lens maybe formed of a first cylindrical lens, the second anamorphic lens may be formed of a second cylindrical lens, and the third anamorphic lens may be formed of a third cylindrical lens.

In the first aspect described above, the laser light source may have a rectangular light emission area having long sides extending in the first direction and short sides extending in the second direction, the second cylindrical lens may have a generatrix extending in the first direction, and the first and third cylindrical lenses may each have a generatrix extending in the second direction.

In the first aspect described above, the first group may be formed of a biconcave lens.

In the first aspect described above, the second group may be formed of a convex lens, and the convex lens may be so configured that at least a light-exiting-side lens surface is formed of an aspheric surface.

In the first aspect described above, the second group may be formed of a planoconvex lens having a flat light incident surface.

In the first aspect described above, the third group may be formed of a convex lens, and the convex lens may be so configured that at least a light-exiting-side lens surface is formed of an aspheric surface.

In the first aspect described above, the third group may be formed of a planoconvex lens having a flat light incident surface.

According to a second aspect of the present disclosure, there is provided a projector including the light source apparatus according to the first aspect, a light modulator that modulates light from the light source apparatus in accordance with image information to form image light, and a projection optical apparatus that projects the image light.

DESCRIPTION OF EXEMPLARY EMBODIMENTS

Figure 1:
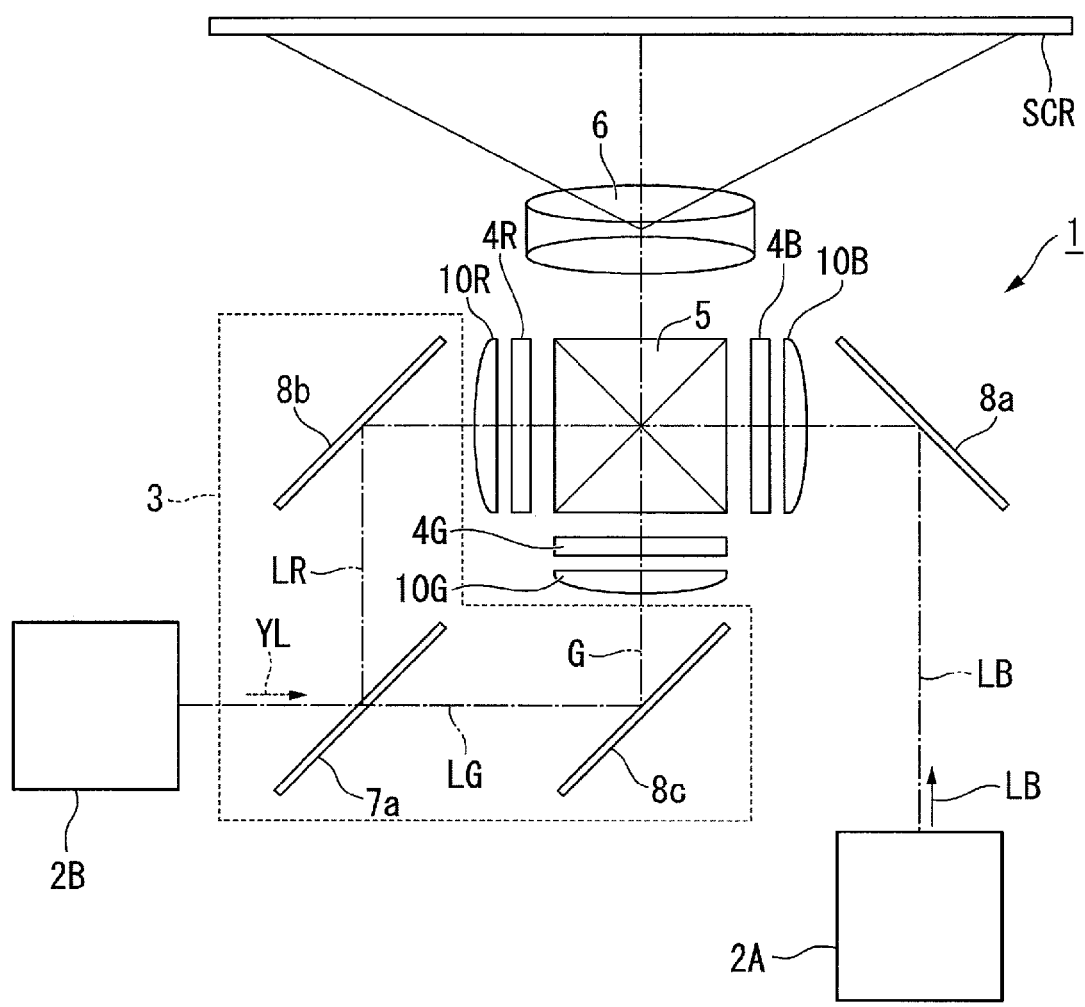
FIG. 1 shows a schematic configuration of a projector according to a first embodiment.

Embodiments of the present disclosure will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

First Embodiment

FIG. 1 shows a schematic configuration of a projector according to the present embodiment.

A projector 1 according to the present embodiment is a projection-type image display apparatus that projects color video images on a screen SCR, as shown in FIG. 1. The projector 1 includes a first light source apparatus 2A, a second light source apparatus 2B, a color separation system 3, a light modulator 4R, a light modulator 4G, a light modulator 4B, a light combining system 5, a projection optical apparatus 6, and a total reflection mirror 8a.

The first light source apparatus 2A outputs blue light LB. The blue light LB is totally reflected of the total reflection mirror 8a and incident on the light modulator 4B. The second light source apparatus 2B outputs yellow fluorescence YL. The yellow fluorescence YL is separated by the color separating system 3 into red light LR and green light LG.

The color separating system 3 includes a dichroic mirror 7a and total reflection mirrors 8b and 8c. Red, green, and blue are hereinafter collectively called RGB in some cases.

The dichroic mirror 7a separates the yellow fluorescence YL from the second light source apparatus 2B into the red light LR and the green light LG. The dichroic mirror 7a reflects the red light LR and transmits the green light LG. The total reflection mirror 8b reflects the red light LR toward the light modulator 4R. The total reflection mirror 8c guides the green light LG to the light modulator 4G.

The light modulator 4R modulates the red light LR in accordance with image information to form red image light. The light modulator 4G modulates the green light LG in accordance with image information to form green image light. The light modulator 4B modulates the blue light LB in accordance with image information to form blue image light.

The light modulators 4R, 4G, and 4B are each formed, for example, of a transmissive liquid crystal panel. Polarizers (not shown) are disposed on the light incident side and the light exiting side of each of the liquid crystal panels.

Field lenses 10R, 10G, and 10B are disposed on the light incident side of the light modulators 4R, 4G, and 4B, respectively.

The image light outputted from each of the light modulators 4R, 4G, and 4B enters the light combining system 5. The light combining system 5 combines the image light from the light modulator 4R, the image light from the light modulator 4G, and the image light from the light modulator 4B with one another and causes the combined image light to exit toward the projection optical apparatus 6. The light combining system 5 is formed, for example, of a cross dichroic prism.

The projection optical apparatus 6 is formed of a projection lens group, enlarges the combined image light from the light combining systems 5, and projects the enlarged image light toward the screen SCR. Enlarged color video images are thus displayed on the screen SCR.

The first light source apparatus 2A will subsequently be described.

Figure 2:
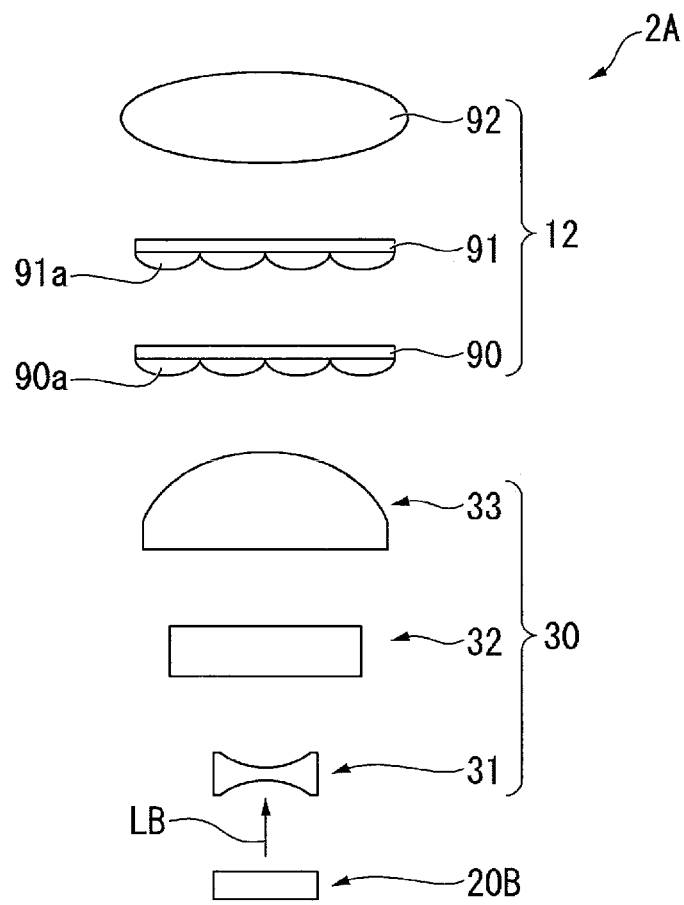
FIG. 2 shows the configuration of a first light source apparatus.

FIG. 2 shows the configuration of the first light source apparatus 2A. The first light source apparatus 2A includes a laser light source 20B, a collimator system 30, and a homogenizing illumination system 12, as shown in FIG. 2.

The laser light source 20B is formed, for example, of a semiconductor laser that outputs the blue light LB having a peak wavelength that falls within a range from 380 to 495 nm.

Figure 3:
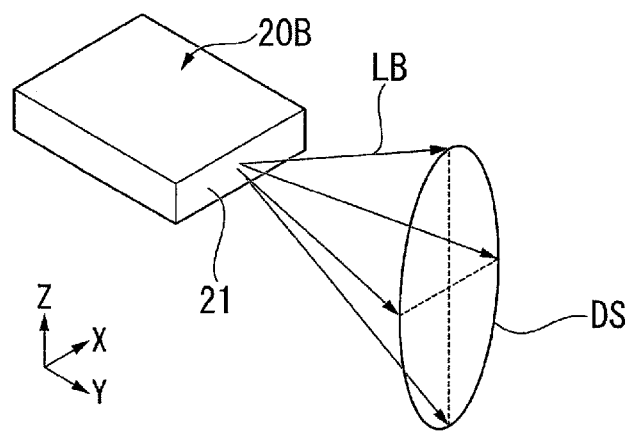
FIG. 3 shows the configuration of key parts of a laser light source.

FIG. 3 shows the configuration of key parts of the laser light source 20B. The laser light source 20B has a light emission area 21, as shown in FIG. 3. The light emission area 21 has a rectangular planar shape. An orthogonal coordinate system is used in the following description. The orthogonal coordinate system has a direction X, which is the lengthwise direction of the rectangular light emission area 21, a direction Y, which is the direction in which the blue light LB exits via the light emission area 21, and a direction Z, which is perpendicular to the directions X and Y and is the widthwise direction of the rectangular light emission area 21.

Specifically, the light emission area 21 has a substantially oblong planar shape having short sides extending in the direction Z and long sides extending in the direction X when viewed along the chief ray of the blue light LB outputted from the laser light source 20B.

The blue light LB outputted from the laser light source 20B is linearly polarized light. The angle of divergence of the blue light LB in the widthwise direction of the light emission area 21 is greater than the angle of divergence of the blue light LB in the lengthwise direction of the light emission area 21. That is, a cross section DS extending along the plane XZ parallel to a plane perpendicular to the optical axis of the blue light LB has an elliptical shape having a minor axis extending in the direction X and a major axis extending in the direction Z.

The collimator system 30 parallelizes the blue light LB from the laser light source 20B.

Figure 4:
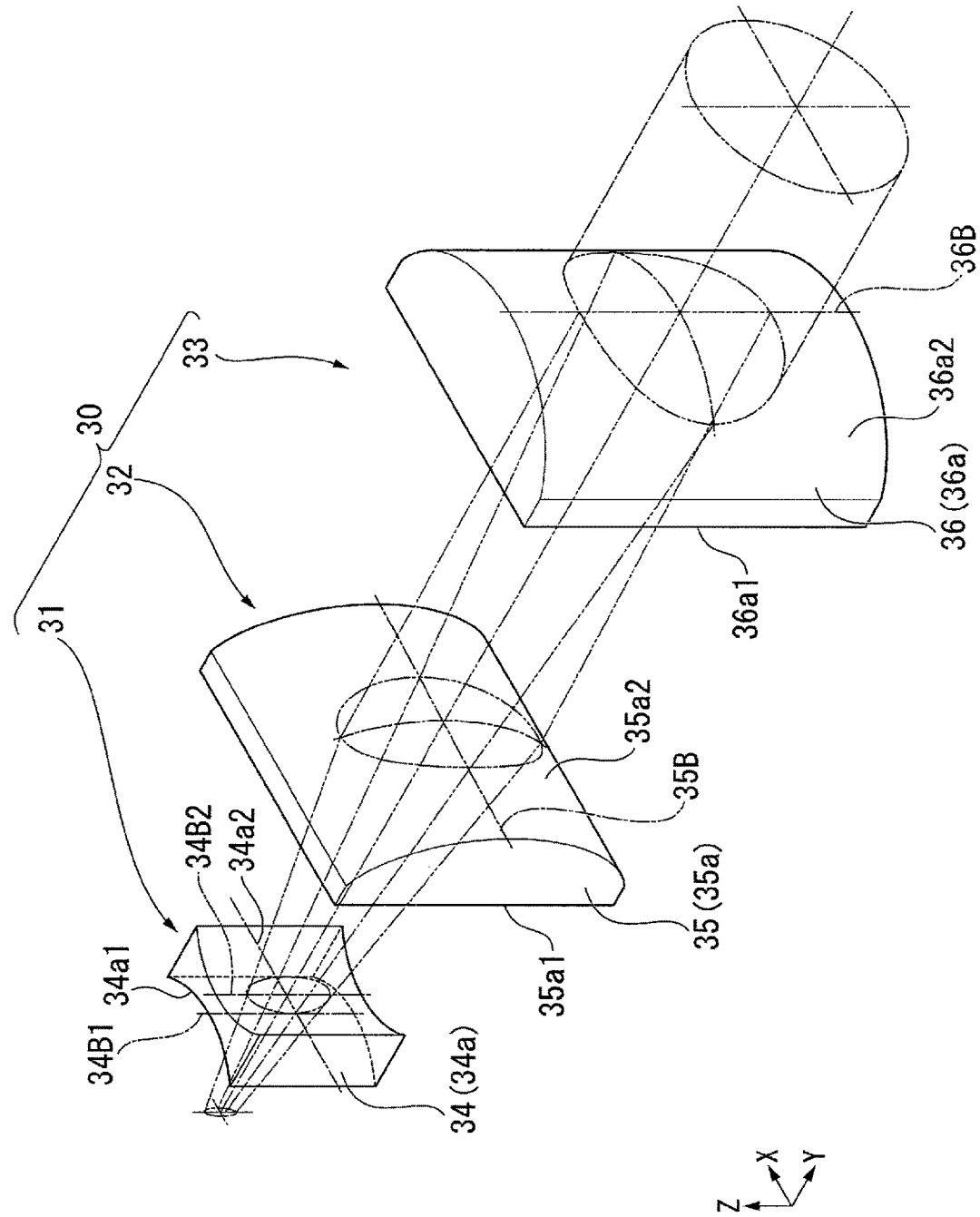
FIG. 4 is a perspective view showing the configuration of a collimator system.

FIG. 4 is a perspective view showing the configuration of the collimator system 30. The collimator system 30 is formed of three lens groups, as shown in FIG. 4. Specifically, the collimator system 30 includes a first group 31, a second group 32, and a third group 33. The first group 31, the second group 32, and the third group 33 are each formed of at least one lens.

In the present embodiment, the first group 31, the second group 32, and the third group 33 are each formed of one lens. The first group 31 includes an anamorphic lens (first anamorphic lens) 34 having negative power in the direction X (first direction). In the present embodiment, the anamorphic lens 34 is formed of a biconcave lens 34a having a first anamorphic surface 34a1 and second anamorphic surface 34a2 on opposite sides.

The first anamorphic surface 34a1 and the second anamorphic surface 34a2 in the present embodiment are formed of cylindrical surfaces having generatrixes 34B1 and 34B2 extending in the direction Z, respectively. That is, the biconcave lens 34a is formed of a first cylindrical lens having negative power in a plane parallel to the plane XY.

The first anamorphic surface 34a1 and the second anamorphic surface 34a2 increase the angle of divergence of the light emitted via the light emission area 21 in the direction X out of the angles of divergence of the light. That is, the first anamorphic surface 34a1 and the second anamorphic surface 34a2 allow further divergence of components of the blue light LB that are components having small angles of divergence.

In the present embodiment, the anamorphic lens 34, which is formed of the biconcave lens 34a, can increase the lens power by causing the blue light LB to diverge when the blue light LB is incident on the lens and when the blue light LB exits out of the lens. The blue light LB having passed through the anamorphic lens 34 therefore has a larger angle of divergence than that of the blue light LB having exited via the light emission area 21. For example, the angle of divergence of the blue light LB in the direction X after the blue light LB passes through the anamorphic lens 34 is equal to the angle of divergence of the blue light LB in the widthwise direction of the light emission area 21.

The blue light LB having passed through the anamorphic lens 34 enters the second lens group 32. The second lens group 32 includes an anamorphic lens (second anamorphic lens) 35 having positive power in the direction Z (second direction) perpendicular to the direction X. In the present embodiment, the anamorphic lens 35 is formed of a planoconvex lens 35a. The planoconvex lens 35a has a first surface (light incident surface) 35a1 formed of a flat surface and a second surface 35a2 located on the light exiting side and formed of an aspheric surface. The second surface 35a2 is formed of a cylindrical surface having a generatrix 35B extending in the direction X (first direction) . That is, the planoconvex lens 35a is formed of a second cylindrical lens having positive power in a plane parallel to the plane ZY.

The second surface 35a2 parallelizes the blue light LB by causing convergence of a component of the blue light LB that is the component caused to diverge in the direction Z along the widthwise direction of the light emission area 21. That is, the second surface 35a2 parallelizes the blue light LB by causing components of the blue light LB that are components having large angles of divergence.

The blue light LB having passed through the anamorphic lens 35 is therefore parallelized in a plane parallel to the plane ZY, where the blue light LB has a large angle of divergence. The blue light LB is not affected by the power of the anamorphic lens 35 in a plane parallel to the plane XY when the blue light LB passes through the anamorphic lens 35, so that the blue light LB keeps diverging in the plane parallel to the plane XY.

In the present embodiment, the anamorphic lens 35, which is formed of the planoconvex lens 35a, is readily manufactured as compared with a case where the anamorphic lens 35 has lens surfaces on opposite sides, whereby the cost of the anamorphic lens 35 can be reduced. The planoconvex lens 35a, which has a flat surface as the first surface 35a1 on the light incident side on which the blue light LB is incident, and a cylindrical surface as the second surface 35a2 on the light exiting side, can increase the distance over which the blue light LB having entered the anamorphic lens 35 is parallelized. Sufficient divergence of the blue light LB is thus achieved, whereby the light flux width of the blue light LB in the direction Z can be increased.

The blue light LB having passed through the anamorphic lens 35 enters the third group 33. The third group 33 includes an anamorphic lens (third anamorphic lens) 36 having positive power in the direction X. In the present embodiment, the anamorphic lens 36 is formed of a planoconvex lens 36a. The planoconvex lens 36a has a first surface (light incident surface) 36a1, which is a flat surface, and a second surface 36a2, which is located on the light exiting side and formed of an aspheric surface. The second surface 36a2 is formed of a cylindrical surface having a generatrix 36B extending in the direction Z (second direction). That is, the planoconvex lens 36a is formed of a third cylindrical lens having positive power in a plane parallel to the plane XY.

The blue light LB has been parallelized in the plane parallel to the plane ZY but diverges in the plane parallel to the plane XY when incident on the planoconvex lens 36a. Since the angle of divergence of the blue light LB in the plane parallel to the plane XY has been so increased as to be as large as the angle of divergence of the blue light LB in the widthwise direction of the light emission area 21, the light flux width of blue light LB in the direction X has been increased when the blue light LB is incident on the anamorphic lens 36. The second surface 36a2 parallelizes the blue light LB by causing convergence of the blue light LB that diverges in the plane parallel to the plane XY.

The blue light LB having passed through the anamorphic lens 36 is therefore parallelized also in the plane parallel to the plane XY, where the angle of divergence of the blue light LB is small.

Since the anamorphic lens 36 is formed of the planoconvex lens 36a, the lens can be readily manufactured, whereby the cost of the anamorphic lens 36 can be reduced. Further, since the planoconvex lens 36a has a flat surface on the side on which the blue light LB is incident and a cylindrical surface on the light exiting side, the distance over which the blue light LB incident on the anamorphic lens 36 is parallelized can be increased. Sufficient divergence of the blue light LB can therefore increase the light flux width of the blue light LB in the direction X.

In the collimator system 30 in the present embodiment, the distance between each of the first group 31, the second group 32, and the third group 33 along the optical path of the chief ray of the blue light LB having exited via the light emission area 21 and the lens power of each of the first group 31, the second group 32, and the third group 33 are so set that the aspect ratio of the cross section of the blue light LB having exited via the light emission area 21 is substantially 1. That is, in the present embodiment, the cross section of the blue light LB outputted from the laser light source 20B is converted by the collimator system 30 from the elliptical shape into a substantially circular shape, as shown in FIG. 4.

As Comparative Example of the collimator lens 30 in the present embodiment, consider now a case where only two cylindrical lenses (anamorphic lenses 35 and 36) are used to parallelize the blue light LB. In this case, the blue light LB having passed through the anamorphic lens 35 is parallelized in the plane parallel to the plane ZY, where the angle of divergence of the blue light LB is large, and parallelized when passing through the anamorphic lens 36 also in the plane parallel to the plane XY, where the angle of divergence of the blue light LB is small.

In the case where only the anamorphic lenses 35 and 36 are used to convert the cross section of the blue light LB from the elliptical shape into a substantially circular shape, it is necessary to increase the distance between the anamorphic lenses 35 and 36 along the optical axis of the chief ray of the blue light LB. The reason for this is as follows: In a case where the distance between the anamorphic lenses 35 and 36 is so set as to be equal to the length of the collimator system 30 in the present embodiment, the light flux width of the blue light LB in the direction X cannot be increased to be as large as the light flux width of the blue light LB in the direction Z by causing the blue light LB to sufficiently diverge in the plane parallel to the plane XY, where the angle of divergence of the blue light LB is small, before the blue light LB is incident on the anamorphic lens 36, so that the cross-sectional shape of the blue light LB cannot be converted into a substantially circular shape.

In contrast, the collimator system 30 in the present embodiment allows the blue light LB to be incident on the anamorphic lens 35, which is the second group 32, with the angle of divergence of the blue light LB in the lengthwise direction of the light emission area 21 so increased by the anamorphic lens 34, which is the first group 31, as to be substantially equal to the angle of divergence of the blue light LB in the widthwise direction of the light emission area 21. Therefore, after the blue light LB is parallelized by the anamorphic lens 35 in the plane parallel to the plane ZY, the blue light LB is allowed to sufficiently diverge before incident on the anamorphic lens 36, whereby the light flux width of the blue light LB can be increased. The cross section of the blue light LB can be converted into a substantially circular shape with the distance between the anamorphic lenses 35 and 36 being smaller than that in the configuration of Comparative Example described above.

According to the collimator system 30 in the present embodiment, employing the three-group configuration in which the anamorphic lens 34, which is the first group 31, is added in the optical path of the blue light LB between the light emission area 21 and the anamorphic lens 35 allows the distance from the light emission area 21 to the anamorphic lens 36 to be reduced as compared with the distance provided by the collimator system in Comparative Example using only the anamorphic lenses 35 and 36. The first light source apparatus 2A including the collimator system 30 in the present embodiment can therefore convert the light flux cross-sectional shape of the blue light LB into a substantially circular shape with no increase in the size of the apparatus.

The homogenizing illumination system 12 includes a first lens array 90, a second lens array 91, and a superimposing lens 92.

The first lens array 90 includes a plurality of first lenslets 90a for dividing the blue light LB having exited out of the collimator system 30 into a plurality of sub-light ray fluxes. The plurality of first lenslets 90a are arranged in an array in a plane perpendicular to the illumination optical axis of the first light source apparatus 2A. In the present embodiment, the light incident area of the first lens array 90 has, for example, a substantially square shape. Since the blue light LB has been converted by the collimator system 30 into parallelized light having a substantially circular cross-sectional shape, the blue light LB is efficiently incident on the entire square light incident area of the first lens array 90.

The second lens array 91 includes a plurality of second lenslets 91a. The plurality of second lenslets 91a correspond to the plurality of first lenslets 90a. The second lens array 91 along with the superimposing lens 92 superimposes images of the first lenslets 90a of the first lens array 90 with one another in an area in the vicinity of an image formation area of the light modulator 4B.

The first light source apparatus 2A according to the present embodiment, which includes the collimator system 30, can convert the cross-sectional shape of the blue light LB into a substantially circular shape with the size of the apparatus reduced. The blue light LB is thus allowed to be efficiently incident on the first lens array 90. The performance of the homogenizing illumination system 12, which superimposes the sub-light ray fluxes of the blue light LB with one another, can therefore be improved.

Figure 5:
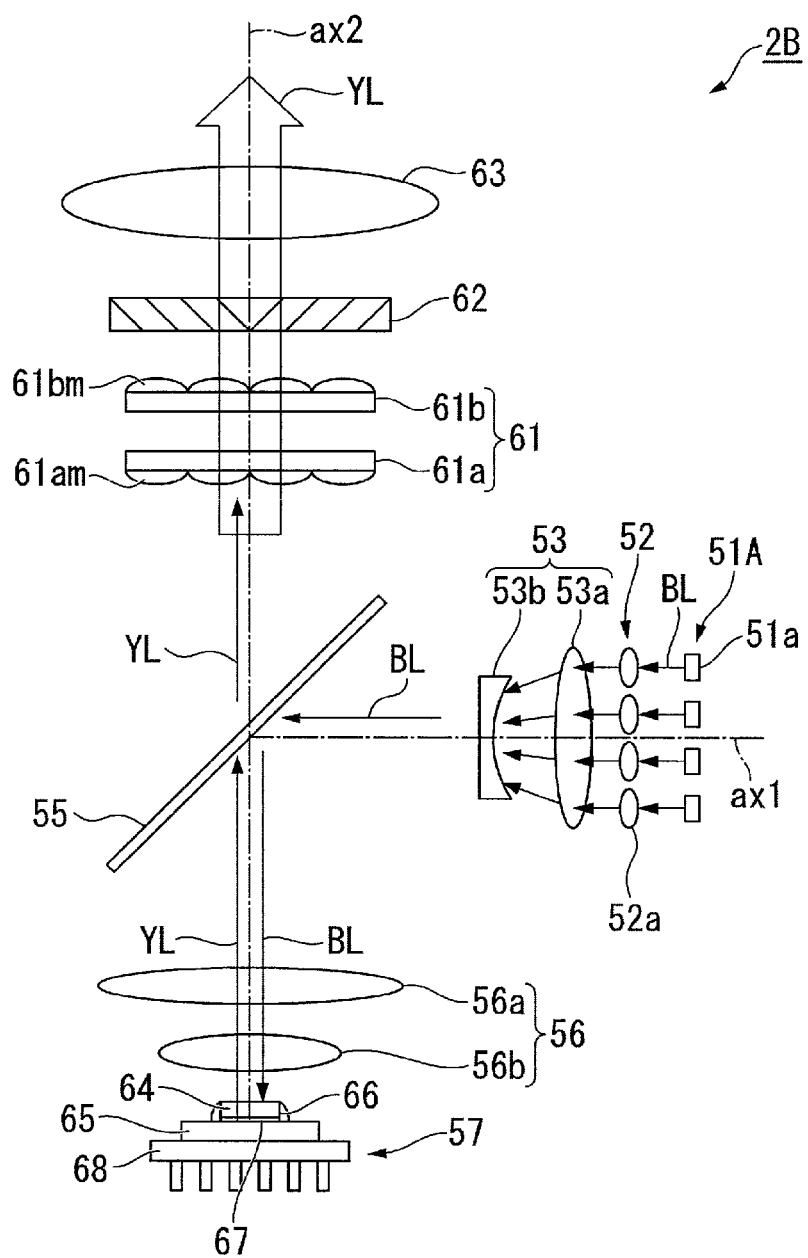
FIG. 5 shows a schematic configuration of a second light source apparatus.

FIG. 5 shows a schematic configuration of the second light source apparatus 2B.

The second light source apparatus 2B includes a blue array light source 51A, a first collimator system 52, an afocal system 53, a dichroic mirror 55, a first light collection system 56, a fluorescence emitter 57, a first lens integrator 61, a polarization converter 62, and a superimposing lens 63, as shown in FIG. 5.

The blue array light source 51A, the first collimator system 52, the afocal system 53, and the dichroic mirror 55 are sequentially arranged along an optical axis ax1. The optical axis ax1 is the optical axis of the blue array light source 51A.

On the other hand, the fluorescence emitter 57, the first light collection system 56, the dichroic mirror 55, the first lens integrator 61, the polarization converter 62, and the superimposing lens 63 are sequentially arranged along an illumination optical axis ax2. The optical axis ax1 and the illumination optical axis ax2 are located in the same plane and perpendicular to each other.

The blue array light source 51A includes a plurality of blue laser light emitters 51a. The plurality of blue laser light emitters 51a are arranged in an array in a plane perpendicular to the optical axis ax1. The blue laser light emitters 51a each emit, for example, blue excitation light BL (blue laser beam that belongs to wavelength band ranging from 440 to 470 nm, for example).

The excitation light BL outputted from the blue array light source 51A enters the first collimator system 52. The first collimator system 52 converts the excitation light BL outputted from the blue array light source 51A into parallelized light. The first collimator system 52 is formed, for example, of a plurality of collimator lenses 52a arranged in an array. The plurality of collimator lenses 52a are disposed in correspondence with the plurality of blue laser light emitters 51a.

The excitation light BL having passed through the first collimator system 52 enters the afocal system 53. The afocal system 53 adjusts the light flux diameter of the excitation light BL. The afocal system 53 is formed, for example, of a convex lens 53a and a concave lens 53b.

The excitation light BL having passed through the afocal system 53 is incident on the dichroic mirror 55. The dichroic mirror 55 is so disposed as to incline by 45° with respect to the optical axis ax1 and the illumination optical axis ax2. The dichroic mirror 55 reflects the excitation light BL toward the fluorescence emitter 57 and transmits the fluorescence YL, which belongs to a wavelength band different from the wavelength band to which the excitation light BL belongs.

Specifically, the dichroic mirror 55 reflects the excitation light BL to cause the reflected excitation light BL to enter the first light collection system 56. The first light collection system 56 collects the excitation light BL and directs the collected excitation light BL toward a phosphor 64 of the fluorescence emitter 57.

In the present embodiment, the first light collection system 56 is formed, for example, of a first lens 56a and a second lens 56b. The collected excitation light BL having exited out of the first light collection system 56 is incident on the fluorescence emitter 57. The fluorescence emitter 57 includes the phosphor 64, a substrate 65, which supports the phosphor 64, and a fixing member 66, which fixes the phosphor 64 to the substrate 65.

In the present embodiment, the phosphor 64 is fixed to the substrate 65 via the fixing member 66 provided between the side surface of the phosphor 64 and the substrate 65. The phosphor 64 is in contact with the substrate 65 on a surface of the phosphor 64 that is the surface opposite the side on which the excitation light BL is incident.

The phosphor 64 contains phosphor particles that absorb the excitation light BL and are excited thereby. The phosphor particles excited with the excitation light BL emit the fluorescence (yellow fluorescence) YL, which belongs to a wavelength band ranging, for example, from 500 to 700 nm.

A reflector 67 is provided on a side of the phosphor 64 that is the side opposite the side on which the excitation light BL is incident (side opposite first light collection system 56). The reflector 67 reflects components of the fluorescence YL produced by the phosphor 64 that are the components traveling toward the substrate 65.

A heat sink 68 is disposed on a surface of the substrate 65 that is the surface opposite the surface that supports the phosphor 64. The heat in the fluorescence emitter 57 can be dissipated via the heat sink 68, whereby degradation of the phosphor 64 due to the heat can be avoided.

Part of the fluorescence YL produced by the phosphor 64 is reflected off the reflector 67 and exits out of the phosphor 64. The remainder of the fluorescence YL produced by the phosphor 64 exits out of the phosphor 64 via no reflector 67. The fluorescence YL thus exits out of the phosphor 64.

The fluorescence YL emitted from the phosphor 64 is non-polarized light. The fluorescence YL passes through the first light collection system 56 and is incident on the dichroic mirror 55. The fluorescence YL then passes through the dichroic mirror 55 and travels toward the first lens integrator 61.

The fluorescence YL exits toward the first lens integrator 61. The first lens integrator 61 includes a first multi-lens 61a and a second multi-lens 61b. The first multi-lens 61a includes a plurality of first lenslets 61am for dividing the fluorescence YL into a plurality of sub-light ray fluxes.

The lens surface of the first multi-lens 61a (surface of each of first lenslets 61am) is conjugate with the image formation area of each of the light modulators 4R and 4G. The shape of each of the first lenslets 61am is therefore substantially similar to the shape of the image formation area of each of the light modulators 4R and 4G (rectangular shape). The sub-light ray fluxes having exited out of the first multi-lens 61a are therefore efficiently incident on the image formation area of each of the light modulators 4R and 4G.

The second multi-lens 61b includes a plurality of second lenslets 61bm corresponding to the first lenslets 61am of the first multi-lens 61a. The second multi-lens 61b along with the superimposing lens 63 forms images of the first lenslets 61am of the first multi-lens 61a in an area in the vicinity of the image formation area of each of the light modulators 4R and 4G.

The fluorescence YL having passed through the first lens integrator 61 enters the polarization converter 62. The polarization converter 62 is formed of polarization separation films and retardation films (half wave plates) arranged in an array. The polarization converter 62 converts the non-polarized fluorescence YL into linearly polarized light and causes the linearly polarized light to exit.

More specifically, the polarization converter 62 is so disposed as to correspond to the direction of the transmission axis of the polarizers (not shown) disposed on the light incident side of the light modulators 4R and 4G. The polarization directions of the red light LR and the green light LG provided from the separation of the fluorescence YL therefore correspond to the direction of the transmission axis of the polarizers on the light incident side of the light modulators 4R and 4G. Therefore, the red light LR or the green light LG is not blocked by the corresponding light-incident-side polarizer, but the red light LR and the green light LG are satisfactorily guided to the image formation areas of the light modulators 4R and 4G.

The fluorescence YL having passed through the polarization converter 62 enters the superimposing lens 63. The superimposing lens 63 cooperates with the first lens integrator 61 to homogenize the illuminance distribution of the fluorescence YL in each illumination receiving area.

As described above, the projector 1 according to the present embodiment, which includes the first light source apparatus 2A capable of converting the cross-sectional shape of the blue light LB into a substantially circular shape, can display a good-quality image by causing the blue light LB to be efficiently incident on the light modulator 4B. Further, since the size of the first light source apparatus 2A can be reduced, the size of the projector 1 itself can be reduced.

Second Embodiment

A projector according to a second embodiment will be subsequently described. The configurations and members common to those in the first embodiment have the same reference characters and will not be described in detail.

Figure 6:
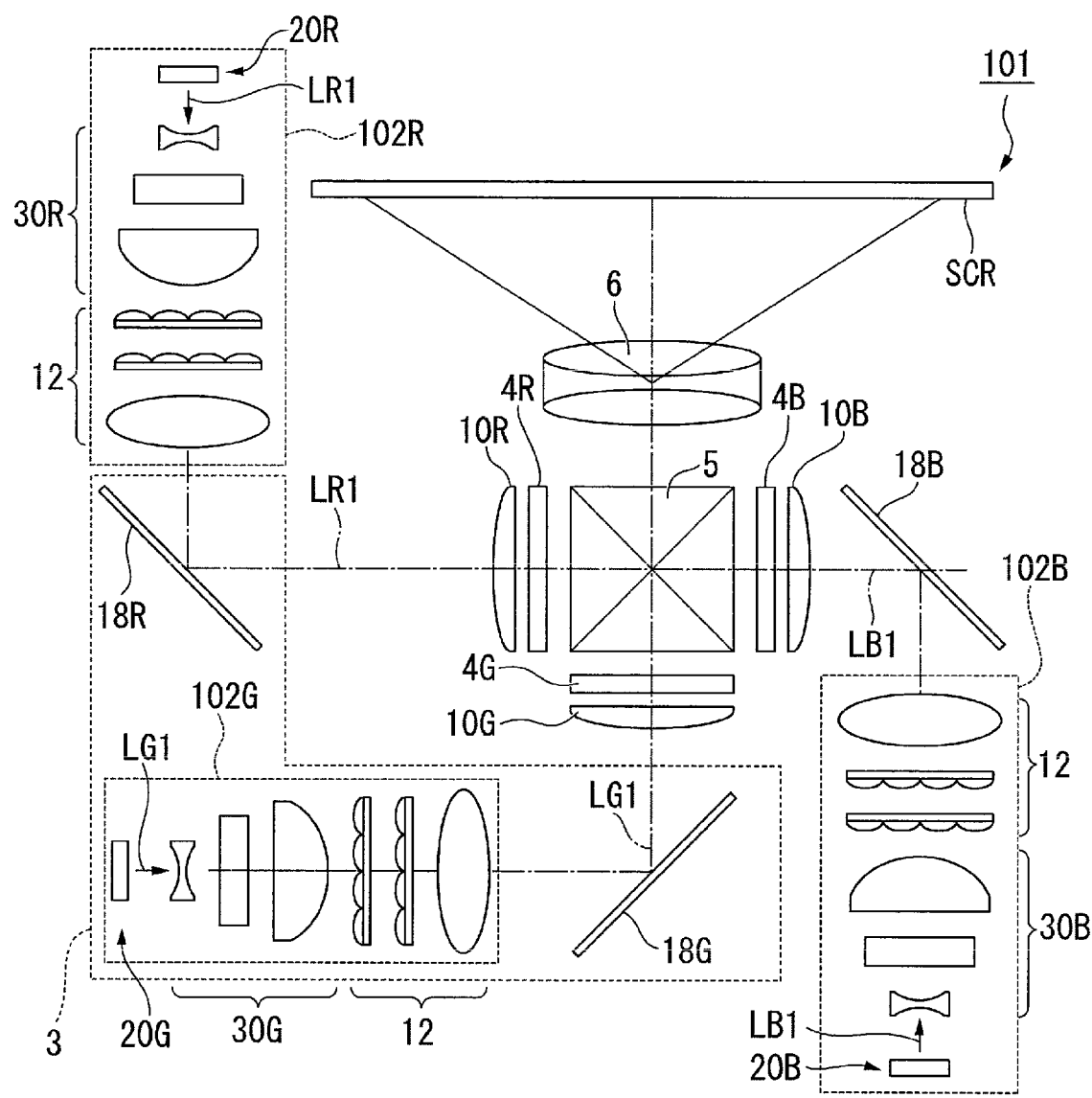
FIG. 6 is a schematic configuration diagram of a projector according to a second embodiment.

FIG. 6 is a schematic configuration diagram of the projector according to the present embodiment.

A projector 101 includes a light source apparatus 102R for red light, a light source apparatus 102G for green light, a light source apparatus 102B for blue light, the light modulators 4R, 4G, and 4B, the field lenses 10R, 10G, and 10B, the light combining system 5, total reflection mirrors 18R, 18G, and 18B, as shown in FIG. 6.

In the present embodiment, the light source apparatus 102B for blue light is formed of the light source apparatus 2A according to the first embodiment. The light source apparatus 102B for blue light can therefore convert the light flux cross-sectional shape of the blue light LB1 into a substantially circular shape with no increase in the size of the apparatus. The blue light LB1 outputted from the light source apparatus 102B for blue light is so totally reflected off the total reflection mirror 18B as to be incident on the light modulator 4B.

The light source apparatus 102G for green light and the light source apparatus 102R for red light differ from the light source apparatus 102B for blue light only in terms of the color of the outputted light (wavelength region) and are the same as the light source apparatus 102B for blue light in terms of the apparatus configuration. The green light LG outputted from the light source apparatus 102G for green light is so totally reflected off the total reflection mirror 18G as to be incident on the light modulator 4G. The red light LR outputted from the light source apparatus 102R for red light is so totally reflected off the total reflection mirror 18R as to be incident on the light modulator 4R.

The light source apparatus 102G for green light includes a laser light source 20G, a collimator system 30G, and the homogenizing illumination system 12. The laser light source 20G is formed, for example, of a semiconductor laser that outputs green light LG1 having a peak wavelength that falls within a range from 495 to 585 nm. The light emission area of the laser light source 20G has a rectangular planar shape. A cross section of the green light LG1 that is the cross section parallel to a plane perpendicular to the optical axis of the green light LG1 has an elliptical shape having a minor axis extending in the direction X and a major axis extending in the direction Z.

The collimator system 30G has the same configuration as that of the collimator system 30 shown in FIG. 4 and parallelizes the green light LG1 from the laser light source 20G. In the present embodiment, the cross-sectional shape of the green light LG1 outputted from the laser light source 20G is therefore converted by the collimator system 30G from the elliptical shape into a substantially circular shape (see FIG. 4).

The light source apparatus 102R for red light includes a laser light source 20R, a collimator system 30R, and the homogenizing illumination system 12. The laser light source 20R is formed, for example, of a semiconductor laser that outputs red light LR1 having a peak wavelength that falls within a range from 585 to 720 nm. The light emission area of the laser light source 20R has a rectangular planar shape. A cross section of the red light LR1 that is the cross section parallel to a plane perpendicular to the optical axis of the red light LR1 has an elliptical shape having a minor axis extending in the direction X and a major axis extending in the direction Z.

The collimator system 30R has the same configuration as that of the collimator system 30 shown in FIG. 4 and parallelizes the red light LR1 from the laser light source 20R. In the present embodiment, the cross-sectional shape of the red light LR1 outputted from the laser light source 20R is therefore converted by the collimator system 30R from the elliptical shape into a substantially circular shape (see FIG. 4).

The light source apparatus 102G for green light, which includes the collimator system 30G in the present embodiment, can therefore convert the light flux cross-sectional shape of the green light LG1 into a substantially circular shape with no increase in the size of the apparatus. The light source apparatus 102R for red light, which includes the collimator system 30R in the present embodiment, can similarly convert the light flux cross-sectional shape of the red light LR1 into a substantially circular shape with no increase in the size of the apparatus.

The light source apparatus 102R for red light, the light source apparatus 102G for green light, and the light source apparatus 102B for blue light according to the present embodiment allow the red light LR1, the green light LG1, and the blue light LB1 to be efficiently incident on the respective homogenizing illumination systems 12. The performance of the homogenizing illumination systems 12, which superimpose the sub-light ray fluxes of the red light LR1, the green light LG1, and the blue light LB1 with one another on the light modulators 4R, 4G and 4B, can therefore be improved.

As described above, the projector 101 according to the present embodiment can display a good-quality image by causing the red light LR1, the green light LG1, and the blue light LB1 to be efficiently incident on the light modulators 4R, 4G, and 4B. Further, since the sizes of the light source apparatus 102R for red light, the light source apparatus 102G for green light, and the light source apparatus 102B for blue light can be reduced, the size of the projector 101 itself can be reduced.

Further, the projector 101 according to the present embodiment, in which the red light LR1 outputted from the light source apparatus 102R for red light, the green light LG1 outputted from the light source apparatus 102G for green light, and the blue light LB1 outputted from the light source apparatus 102B for blue light are so reflected off the total reflection mirrors 18R, 18G, and 18B as to be incident on the light modulators 4R, 4G, and 4B, whereby the light source apparatus 102R for red light, the light source apparatus 102G for green light, and the light source apparatus 102B for blue light can be so disposed as to surround the circumference of the projection optical apparatus 6. The space around the projection optical apparatus 6 can thus be effectively used to dispose the light source apparatuses. The size of the projector 101 can therefore be reduced as compared with a case where the total reflection mirrors 18R, 18G, and 18B are not used.

The present disclosure is not limited to the contents of the embodiments described above and can be changed as appropriate to the extent that the change does not depart from the substance of the present disclosure.

In the embodiments described above, the first group 31, the second group 32, and the third group 33, which form each of the collimator systems 30, 30R, 30G, and 30B, are each formed of one lens, and at least any of the first group 31, the second group 32, and the third group 33 may be formed of a plurality of lenses. Further, the above embodiments have been described with reference to the case where the second surfaces 35a2 and 36a2 of the planoconvex lenses 35a and 36a, which form the anamorphic lenses 35 and 36, are each an aspheric surface, and the second surfaces 35a2 and 36a2 may each be a spherical surface.

What is claimed is:

1. A light source apparatus comprising:
a laser light source that outputs a laser beam; and
a collimator system that parallelizes the laser beam,
wherein the collimator system includes three lens groups,
a first group includes a first anamorphic lens having negative power in a first direction,
a second group includes a second anamorphic lens having positive power in a second direction perpendicular to the first direction, and
a third group includes a third anamorphic lens having positive power in the first direction, and
wherein the first anamorphic lens is formed of a first cylindrical lens,
the second anamorphic lens is formed of a second cylindrical lens
the third anamorphic lens is formed of a third cylindrical lens,
the laser light source has a rectangular light emission area having long sides extending in the first direction and short sides extending in the second direction,
the second cylindrical lens has a generatrix extending in the first direction, and
the first and third cylindrical lenses each have a generatrix extending in the second direction.

2. The light source apparatus according to claim 1, wherein the first group is formed of a biconcave lens.

3. A projector comprising:
the light source apparatus according to claim 2;
a light modulator that modulates light from the light source apparatus in accordance with image information to form image light; and
a projection optical apparatus that projects the image light.

4. The light source apparatus according to claim 1, wherein the second group is formed of a convex lens, and alight-exiting-side surface of the convex lens is an aspheric surface.

5. A projector comprising:
the light source apparatus according to claim 4;
a light modulator that modulates light from the light source apparatus in accordance with image information to form image light; and
a projection optical apparatus that projects the image light.

6. The light source apparatus according to claim 4, wherein the second group is formed of a. planoconvex lens having a flat light incident surface.

7. A projector comprising:
the light source apparatus according to claim 6;
a light modulator that modulates light from the light source apparatus in accordance with image information to form image light; and
a projection optical apparatus that projects the image light.

8. A projector comprising:
the light source apparatus according to claim 1;
a light modulator that modulates light from the light source apparatus in accordance with image information to form image light; and
a projection optical apparatus that projects the image light.

9. The light source apparatus according to claim 1, wherein the third group is formed of a convex lens, and a light-exiting-side surface of the convex lens is an aspheric surface.

10. A projector comprising:
the light source apparatus according to claim 9;
a light modulator that modulates light from the light source apparatus in accordance with image information to form image light; and
a projection optical apparatus that projects the image light.

11. The light source apparatus according to claim 9, wherein the third group is formed of a planoconvex lens having a flat light incident surface.

12. A projector comprising:
the light source apparatus according to claim 11;
a light modulator that modulates light from the light source apparatus in accordance with image information to form image light; and
a projection optical apparatus that projects the image light.

* * * * *